Figure 1:
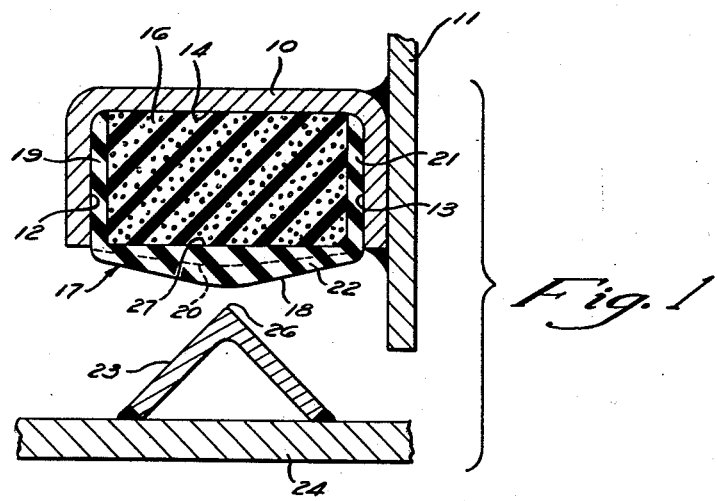

March 31, 1964 W. HAMILTON 3,126,591
HATCH COVER SEAL
Filed July 13, 1961

INVENTOR.
WALLACE HAMILTON
BY
David Young
ATTORNEY

United States Patent Office 3,126,591
Patented Mar. 31, 1964

3,126,591
HATCH COVER SEAL
Wallace Hamilton, Chagrin Falls, Ohio, assignor to Pneumo Dynamics Corporation, Cleveland, Ohio, a corporation of Delaware
Filed July 13, 1961, Ser. No. 123,734
4 Claims. (Cl. 20—69)

This invention relates generally to sealing or gasket assemblies and more particularly to a sealing assembly suitable for use on ship hatch covers and the like.

It is normally necessary to provide a hydraulic seal on weather deck hatch cover systems of the type disclosed in my co-pending application, Serial No. 69,845, filed November 17, 1960. It is also necessary in some instances to provide hydraulic seals for hatch covers located on lower decks.

A seal assembly incorporating this invention is particularly suited for such hatch cover installations since it is substantially immune to damage and reliably provides the hydraulic seal necessary in such installations. The preferred form of this invention is constructed and arranged so that the resulting device meets all the requirements of marine applications. The more important requirements include low initial cost, ability to withstand all types of adverse weather conditions from extreme heat to extreme cold, the ability to withstand wear or damage occurring during the operation of the hatch covers and the cargo handling on the ship, the ability to maintain a seal in spite of the wearing action occurring when the ship works under rough seas conditions, and to provide a suitable sealing structure for installations where dimensional tolerances are not closely maintained.

It is an important object of this invention to provide a hydraulic seal suitable for marine hatch covers which is able to withstand severe environmental conditions.

It is another important object of this invention to provide a new and improved seal wherein the compression of the seal can vary widely without damaging the seal or causing functional failure.

It is another important object of this invention to provide a new and improved seal assembly including a U-shaped channel in which a resilient gasket material is mounted, constructed and arranged so that operation of the seal produces increased surface pressure between the gasket material and the side walls of the mounting channel.

It is another important object of this invention to provide a hydraulic seal assembly which includes gasket material cemented into a supporting channel wherein the gasket material is constructed and arranged so that the cement is never placed in tension to cause pulling away or breaking of the cemented bond.

It is still another object of this invention to provide a new and improved seal structure having a composite gasket assembly including a compressible core and a wear resisting shield arranged to prevent separation between the gasket material and the mounting channel in which it is supported.

Figure 2:
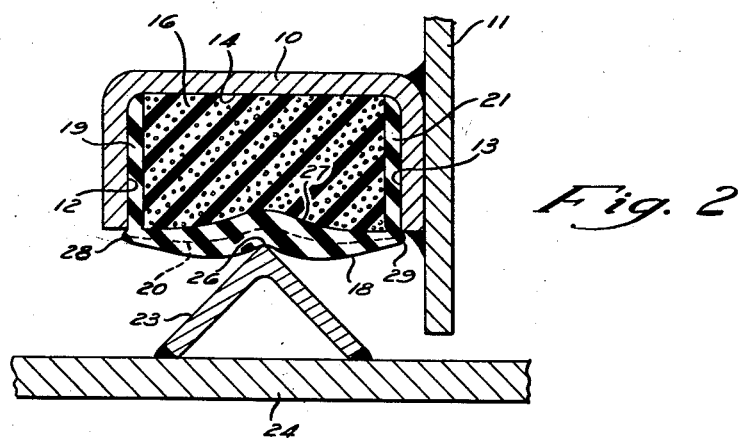

Further objects and advantages will appear from the following description and drawings wherein:

FIGURE 1 is a fragmentary cross-section of a preferred structure incorporating this invention illustrating the positions the elements assume when the surfaces to be sealed are spaced from each other and the elements are in their unstressed conditions; and FIGURE 2 is a cross-section similar to FIGURE 1 illustrating the operation of the seal when it provides a fluid tight joint between the movable members.

Referring to the drawings, the seal assembly is illustrated as it could be used on a hatch cover system of the type disclosed in my co-pending application cited above. The assembly includes a channel 10 welded to the side skirt 11 of a hatch cover panel. The channel is preferably formed with a U-shape having opposed side walls 12 and 13 and a lateral wall 14. Positioned within the channel 10 is a core element 16 formed of a cellular sponge type rubber or synthetic rubber. Around the core 16 is a shield element 17 formed of solid, substantially incompressible rubber like material. It has been found in actual practice that neoprene synthetic rubber made by the E. I. Dupont Company provides satisfactory shield because of its ability to withstand severe environmental conditions and its resistance to abrasion or wear. Other suitable rubber like materials, however, can be used. The core 16 is also formed of neoprene sponge.

The shield 17 is preferably formed with a U-shape having its open side adjacent the lateral wall 14 of the channel 10 and an outwardly projecting outer surface 18. In normal practice the core 16 is cemented to the lateral wall 14 of the channel 10 and to the inner faces of legs 19 and 21 of the shield 17 as well as the inner face of a lateral section 22 of the shield 17. Generally, the outer faces of the legs 19 and 21 are also cemented to the opposed side walls 12 and 13 of the channel 10 respectively.

In order to provide the abutting portion of the seal assembly, an angle iron 23 is welded to the ship's coaming illustrated fragmentarily at 24 so that it provides a corner at 26 which is engaged by the outer surface 18 of the shield 17 when the channel 10 moves toward the coaming 24 to the position of FIGURE 2.

In the illustrated embodiment the inner wall 27 of the lateral section 22 is planar and the outer wall 18 is outwardly projecting, and therefore, the mean length of the lateral section 22, represented by the dotted line 20, is greater than the spacing between the opposed side walls 12 and 13 of the channel 10. For this reason when the shield engages the corner 26 and is deflected inwardly as illustrated in FIGURE 2, the major portion of the material forming the lateral section 22 of the shield 17 is placed in compression, rather than tension. As a result, the shield is laterally pressed into tight engagement with the side walls 12 and 13 as is illustrated by the bulge occurring at 28 and 29 in FIGURE 2 at the corners of the shield.

If, however, the shield were formed with a planar or concave outer wall engaged by the corner 26, the lateral section would be placed in tension causing the corners to lift away from the side walls 12 and 13. Such a structure would result in the breaking of the cemented bond if such is used and the possible entry of foreign material into the zone between the side walls 12 and 13 and the legs 19 and 21 respectively. By providing a lateral section 22 with a mean length greater than the spacing between the side walls 12 and 13 and an outwardly projecting outer surface 18, such a difficulty is completely eliminated and an improved seal is provided. In fact a seal of this structure can be positioned in the channel 10 without cementing and proper sealing will be achieved since the shield will be laterally pressed into sealing engagement with the side walls 12 and 13 of the channel 10.

Since the core 16 is formed of a compressible cellular material, it permits the deflection of the lateral section 22 by engagement with the corner 26 to provide proper sealing between the surface 18 and the angle iron 23.

In actual practice it has been found that proper sealing will be maintained even when the corner 26 becomes rough due to corrosion or the like which occurs in marine installations and that the shield provides sufficient resistance to wear and deterioration by the environment to provide a long trouble free service life even under the most adverse conditions.

The structure also permits a wide variation in the amount of deflection caused by the engagement of the shield with the corner 26 while still providing proper function and durability. This is extremely important in installations of the marine type since the tolerances of manufacture are fairly large and also since the ship tends to work under rough seas conditions when proper function of the seal is of utmost importance. This is due to the fact that the composite gasket assembly provides sufficient spring rate to maintain the proper seal under a wide variety of compression conditions.

Although the seal incorporating this invention is described in connection with a marine installation on a hatch cover, it should be understood that it could be used in other suitable installations particularly when the service requirements are relatively severe.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

1. A sealing assembly for providing a fluid tight joint between two members comprising a channel having a lateral wall and oppositely disposed side wall portions extending in the same direction from one side of said lateral wall to define a confining space, a cellular compressible core disposed in said space, a shield element of substantially solid incompressible elastomer material having oppositely disposed leg portions extending into said space between said core and the side wall portions of the channel, and an outer lateral section extending between said leg portions and joined thereto, said outer lateral section of the shield element being disposed adjacent the outer edges of said side wall portions of the channel, a portion of said outer lateral section of the shield element having a length substantially greater than the distance between the inner surface of said side wall portions of the channel whereby flexing of said lateral section of the shield element toward said outer lateral wall of the channel causes the opposite ends of the outer lateral section of the shield element to bulge outwardly and overlap the outer edges of said side wall portions of the channel.

2. The sealing assembly as set forth in claim 1 wherein said outer lateral section of the shield element has a cross section of substantially triangular configuration, with the side thereof facing said core being substantially planar and forming the base of a triangle and the side thereof facing away from the core forming two sides of the triangle.

3. A sealing assembly for providing a fluid tight joint between two members comprising a rigid U shape channel having a web and two oppositely disposed wall portions defining a space therebetween, a cellular compressible core disposed in said space, a U shape shield member having a lateral section and two oppositely disposed leg portions, said shield member being of flexible solid rubber material with the leg portions thereof extending into said space and disposed therein between said core and the channel wall portions, said lateral section of the shield member being disposed adjacent the outer ends end portions of said channel wall portions and extending across said space, said lateral section of the shield member further having a cross section of triangular configuration with the side thereof facing said core being substantially coplanar with the side thereof facing away from said core having two outwardly tapered portions with the length of said tapered portions being substantially greater than the width of the space extending between the inner surfaces of said wall portions of the channel so that flexing of the lateral section of said shield member in a direction toward the web of said channel causes the opposite ends of said lateral section of the shield member to bulge outwardly and overlap the outer edges of the wall portions of the element.

4. A sealing assembly comprising an elongate element having laterally opposed spaced apart wall portions defining a space therebetween, a core element disposed within the confines of the space defined by the wall portions of the elongate element, said core element being formed of rubber like compressible material, a shield element for said core element, said shield element being formed of flexible, substantially incompressible material and having leg portions which are disposed within the confines of the wall portions of the elongate element and intermediate the core element and the respective wall portion of the elongate element with the leg portions thereof being in engagement with the core element and the respective wall portion, and said shield element further having an intermediate portion extending between the leg portions thereof with said intermediate portion of the shield element being disposed in engagement with the core element and having a laterally extending enlarged part that projects away from the confines defined by the wall portions of the elongate element to create a surface which projects beyond the confines thereof, with said surface having a lateral length which is greater than the spacing between the inner surfaces of the wall portions of the elongate element to enable the intermediate portion of the shield element to be engaged with structure, so that the intermediate portion of the shield element is urged toward the confines defined by the wall portions of the elongate element, with the intermediate portion of the shield element compressing the core element to cause the leg portions and the intermediate portion of the shield element as well as the core element to be effectively laterally spread relative to the wall portions of the elongate element to maintain the core element within the confines of the wall portions and the leg portions in engagement with the wall portions of the elongate element and create a seal like joint between the intermediate portion of the shield element and such structure which is engaged thereby.

References Cited in the file of this patent

UNITED STATES PATENTS

| | | |
|---|---|---|
| 251,420 | Davis | Dec. 27, 1881 |
| 1,599,652 | Cranston | Sept. 14, 1926 |
| 2,257,775 | Zellers | Oct. 7, 1941 |
| 2,275,235 | Shanklin et al. | Mar. 3, 1942 |
| 2,421,400 | Young | June 3, 1947 |
| 2,552,641 | Morrison | May 15, 1951 |
| 2,654,921 | Blanchard | Oct. 13, 1953 |
| 2,962,183 | Rill et al. | Nov. 29, 1960 |
| 3,035,733 | Knapp | May 22, 1962 |